United States Patent
Teper

[11] Patent Number: 5,860,774
[45] Date of Patent: Jan. 19, 1999

[54] VALVE RESURFACING DEVICE

[75] Inventor: Boris R. Teper, Corunna, Mich.

[73] Assignee: Neway Manufacturing, Inc., Corunna, Mich.

[21] Appl. No.: 995,735

[22] Filed: Dec. 22, 1997

[51] Int. Cl.[6] .................................................. B23B 39/00
[52] U.S. Cl. ...................... 408/108; 408/83.5; 408/103; 408/105; 408/227; 409/140
[58] Field of Search .................... 408/83.5, 103, 408/104, 105, 108, 227, 107; 409/140

[56] References Cited

U.S. PATENT DOCUMENTS

| | | | |
|---|---|---|---|
| 378,196 | 2/1888 | Dunn | 408/105 |
| 1,235,959 | 8/1917 | Bradfield . | |
| 1,449,977 | 3/1923 | Filson | 408/83.5 |
| 1,450,116 | 3/1923 | Ruhlandt | 408/83.5 |
| 1,558,825 | 10/1925 | Beard . | |
| 1,604,966 | 11/1926 | Brooks et al. . | |
| 1,631,850 | 5/1927 | Beard | 408/83.5 |
| 1,884,460 | 10/1932 | Williams . | |
| 2,126,789 | 8/1938 | Lindsey | 408/83.5 |
| 3,354,528 | 11/1967 | Appleby . | |
| 3,391,604 | 7/1968 | Appleby . | |
| 3,461,775 | 8/1969 | Devanney et al. | 408/83.5 |
| 4,147,462 | 4/1979 | Appleby et al. . | |
| 4,637,762 | 1/1987 | Acker | 408/203.5 |
| 5,401,127 | 3/1995 | Nakajima et al. | 409/140 |

FOREIGN PATENT DOCUMENTS

| | | |
|---|---|---|
| 155 047 | 2/1954 | Australia . |
| A-91999/82 | of 1982 | Australia . |
| 8230294 U | 3/1983 | Germany . |

*Primary Examiner*—Steven C. Bishop
*Assistant Examiner*—Adesh Bhardava
*Attorney, Agent, or Firm*—Flynn, Thiel, Boutell & Tanis, P.C.

[57] ABSTRACT

A device for resurfacing the valve face of a poppet valve in which the pressure between a cutting surface and the valve face is controllable by the operator during the surfacing operation. A bearing case is rotatably attached to a base which is attached to a pair of gripping blocks. A cutting head is rotatably mounted on the bearing case. The cutting head, the bearing case, the base and the gripping blocks define a passage into which a valve stem is inserted. The gripping blocks are clamped in a vise which in turn clamps the valve stem in the device. When the bearing case is rotated, pressure between the cutting surface and the valve face is increased. When the cutting head is rotated, the valve face is resurfaced.

20 Claims, 4 Drawing Sheets

FIG. 7

VALVE RESURFACING DEVICE

FIELD OF THE INVENTION

This invention relates to a tool for resurfacing the annular seating surface or face on a poppet valve of the type used in internal combustion engines.

BACKGROUND OF THE INVENTION

The resurfacing of the seating surface on poppet valves for internal combustion engines has typically required utilization of cumbersome and expensive machinery which effects a grinding of the seating surface. Such machinery is not only expensive to purchase and maintain, but is also complex to operate. Small repair shops generally cannot afford such machinery, and hence will often replace the valve due to an inability to efficiently refinish the seating surface of the old valve.

To provide a simple and inexpensive tool for refacing of poppet valves, U.S. Pat. No. 4,637,762, owned by the assignee hereof, discloses a valve refacing device employing a cylindrical sleevelike housing having a conical recess formed in one or both ends thereof. One or more carbide cutting blades are mounted on the housing so as to project outwardly from a conical surface defining the conical recess. With this device, the poppet valve is positioned so that the stem projects coaxially through a clearance opening provided in the housing, whereupon the valve seating surface is positioned within the recess for engagement with the cutting blades. Relative rotation between the device and the poppet valve effects cutting, and hence refacing, of the seating surface. This device can be readily manufactured to accommodate different valve seat angles.

While the device of U.S. Pat. No. 4,637,762 performs a desirable valve refacing operation, nevertheless this device does possess inconveniences. For example, the free end of the valve stem is typically gripped by a vise to stationarily support the valve, following which the device is manually gripped and axially pulled toward the valve head to control the contact pressure between the cutting blades and the valve face, whereupon manual rotation of the device then effects desired refacing of the valve face. Gripping the valve stem by the rough vise surfaces may, however, damage the valve stem. Also, the contact pressure between the cutting blade and the valve face is controlled by the operator pulling on the device at the same time he is rotating it, and it is difficult to apply an even pressure while at the same time turning the device at a uniform rotational speed. Further, when a small-diameter valve is refaced, the unsupported length of the valve stem can lead to valve tipping in the conical recess if the operator relaxes the contact pressure, which can then result in uneven cutting.

There is thus a need for a manual valve resurfacing device that can readily hold a valve without damage and that can apply an even pressure between the cutting blade and valve face while the cutting blade is being rotated. The present invention relates to an improved valve refacing device which is believed capable of performing in this manner, and hence overcomes the disadvantages associated with prior devices.

SUMMARY OF THE INVENTION

The valve refacing device of this invention is used for refacing an annular valve face on a head end of a poppet valve, which valve has an elongate stem projecting coaxially from the head end. The refacing device includes a conventional cutting head assembly having a housing with a passage extending axially through, which passage at one end defines an upper conical recess which diverges outward for accepting the valve head. The recess has one and preferably three, cutting elements mounted therein. The device also includes a gripping mechanism having a pair of gripping jaws for gripping the valve stem. A support structure is located between the cutting head assembly and the gripping mechanism to rotatably support the cutting head assembly for rotation about the longitudinally extending axis of the passage. A connecting structure is joined between the support structure and the gripping mechanism. The connecting structure allows adjustment of a force tending to urge the gripping mechanism and the cutting head assembly away from one another to vary the contact pressure between the valve head and the cutting elements as the stem is clamped between the gripping jaws.

In the valve refacing device, according to the disclosed and preferred embodiment, the support structure includes an annular case with a surrounding cam such as a thread. The connecting structure includes an annular base with a surrounding cam such as a thread. The threads on the case and base are engaged and cooperate to urge the case toward or away from the base as the case is rotated. A spring arrangement such as an elastomeric O-ring is located between the gripping mechanism and the base for maintaining contact pressure between the valve face and the cutting elements. Once the desired pressure between the valve face and the cutting elements is obtained, the cutting head assembly is rotated to resurface the valve face.

The valve refacing device according to the present invention, a preferred embodiment of which is summarized above, provides a portable and compact device which can be readily moved about and utilized in conjunction with a conventional clamping or holding device, such as a conventional vise, so as to effectively permit manual resurfacing of a valve face in a easy and efficient manner without requiring elaborate tools or machinery. The refacing device is economical to purchase and use, and is readily adaptable for use with a wide range of conventional poppet valves of different sizes.

The valve refacing device, as aforesaid, is desirably provided with a cutting head assembly removably but rotatably supported on the support arrangement so that the cutter head assembly can be readily interchanged with another cutter head assembly when desired so as to provide for use on different sizes of valves, such being possible by providing a family of different cutter head assemblies if desired. In the illustrated and preferred embodiment, the cutter head assembly is provided with truncated conical recesses at opposite ends of the housing which each mount a plurality of cutting elements, and which define different standardized valve face angles, preferably 30° and 45° angles. This thus greatly increases the flexibility of the overall device by permitting the cutting head assembly to be readily mounted on, and interchangeably inverted, so that either the 30° angle or the 45° is accessible for use with a selected poppet valve.

The valve refacing device, as aforesaid, also preferably utilizes three cutting elements associated with the cutting head assembly in angularly spaced relationship therearound which, in conjunction with resilient compressibility incorporated into the overall device, readily enables the head of the valve to effectively self-center when stationarily clamped within the device so as to ensure that all of the cutting blades properly engage and effect proper resurfacing of the valve face when relative rotation occurs therebetween.

Other objects and purposes of the present invention will be apparent to persons familiar with devices of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Figure 1:
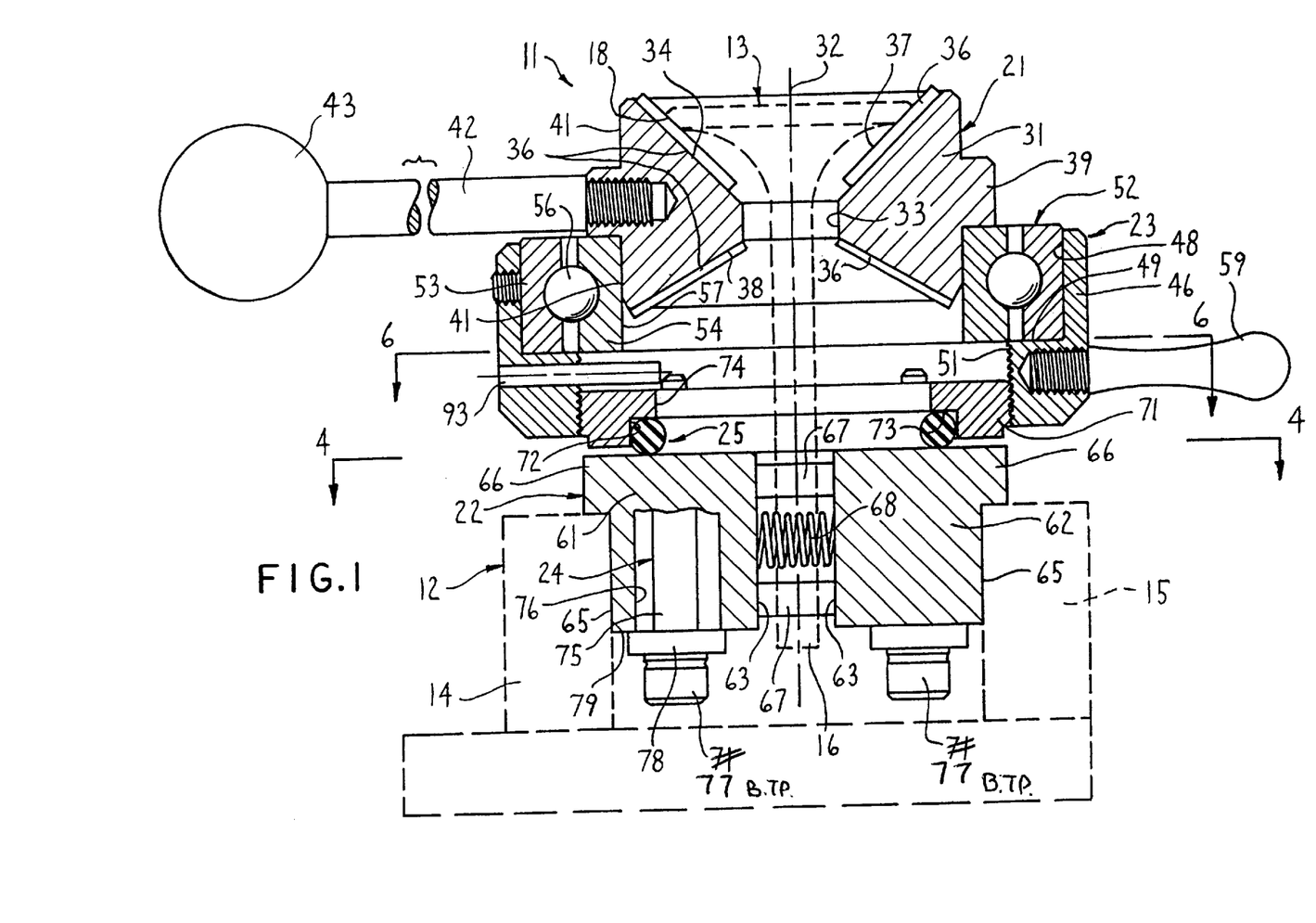
FIG. 1 is a side cross-sectional view of the valve resurfacing device of the invention and showing, in dotted lines, a valve mounted therein.

Referring to the drawings and specifically FIG. 1, there is illustrated a valve refacing device 11 according to the present invention. This device 11 is adapted to be mounted in a conventional clamping or holding device 12 to permit cooperation with a conventional poppet valve 13.

The conventional clamping or holding device 12, in the illustrated embodiment, is a conventional vise of the type having opposed clamping jaws 14 and 15 which are relatively movable toward and away from one another to permit an object to be stationarily clampingly held therebetween. The clamping jaws in such conventional vise are typically connected to a manually rotatable actuator screw or thread member which extends and connects transversely between the jaws to effect movement thereof. Such vise is well known, and further description thereof is believed unnecessary.

Figure 3:
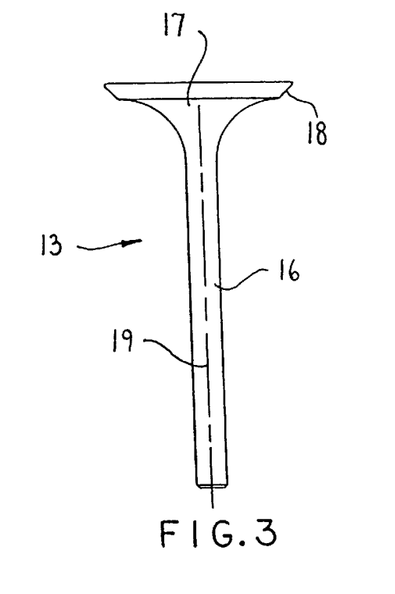
FIG. 3 is a side view of a conventional poppet-type valve for an internal combustion engine.

As to the poppet valve 13, and as illustrated in FIG. 3, such valve is conventionally utilized in internal combustion engines and includes an elongate stem or rod 16 having an enlarged annular head 17 at one free end thereof. The head 17 has, on the back surface thereof, an annular valve surface 18 which is disposed concentrically with respect to the longitudinally extending axis 19 of the valve. This valve surface 18 is conventionally formed as a truncated conical surface, and a conventional angle for such truncated conical valve surface is either 30° or 45°. This valve surface 18 is adapted to be moved into contacting sealing surface with an opposed valve seat (not shown) as provided on the housing of an engine, as is well known. This valve surface 18 is exposed to hot and corrosive gases during operation of an internal combustion engine, and thus periodic replacement of the valve or periodic resurfacing of the valve surface is necessary in order to preserve proper engine operation.

The valve refacing device 11 of this invention is particularly desirable for permitting substantially manual refacing of the valve surface 18 by permitting cooperation with the valve 13 when the latter is mounted in the device, substantially as indicated by the dotted line position of the valve 13 in FIG. 1.

The valve refacing device includes a rotatable cutting head assembly 21 provided at one end thereof, and a gripping mechanism 22 provided at the other end thereof, which gripping mechanism is adapted to be removably clampingly held in the conventional vise or holding device 12. The cutting head assembly 21 is rotatably but removably supported on an intermediate support structure 23, the latter being joined to the gripping mechanism 22 by a connecting structure 24 which is disposed generally therebetween. An energy or pressure generating structure 25 is associated with the valve refacing device 11 for creating, during operation of the device 11, a longitudinally directed pressure or force which tends to effect longitudinal separation between the cutting head assembly 21 and the gripping mechanism 22 to thus provide desired pressurized contact between the valve surface 18 and the cutting elements of the cutting head assembly, as explained hereinafter.

Figure 2:
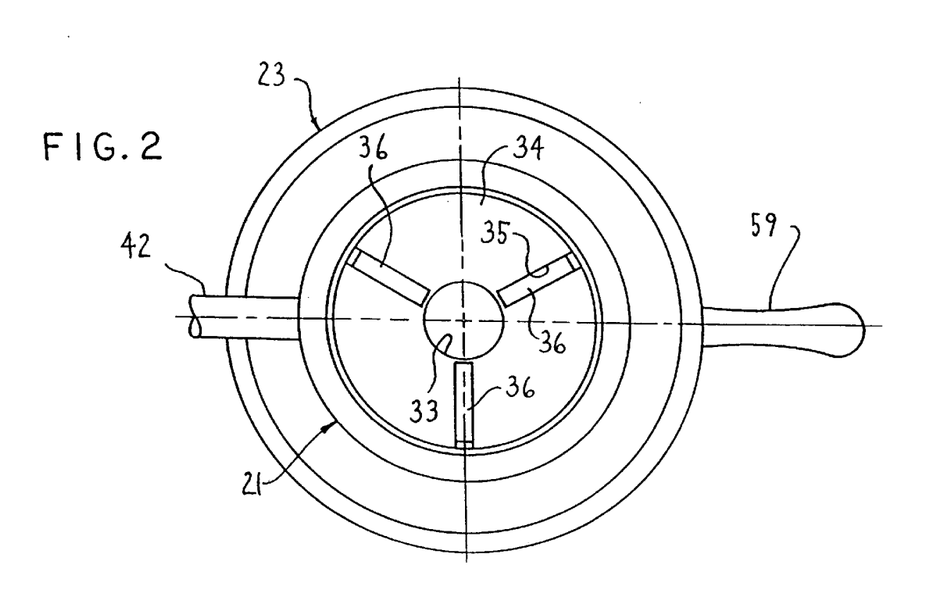
FIG. 2 is a top view of FIG. 1.

Considering first the cutting head assembly 21, as shown in FIGS. 1 and 2, such assembly includes a generally cylindrical housing 31 having a passage 33 extending coaxially therethrough generally along the longitudinal axis 32 of the refacing device. This housing 31 has a truncated conical recess 34 which diverges upwardly at one end of the passage 33 and opens outwardly through the end of the housing. This truncated conical recess 31 is defined by a truncated conical surface which has one, and preferably at least three, grooves 35 formed therein and extending generally radially between the inner and outer diameters of the truncated conical recess. These grooves 35 are preferably disposed in angularly spaced relation around the recess, and each removably mounts therein an elongate block-like cutting element 36 which projects a small distance into the recess and defines an upper cutting surface 37 thereon, the latter preferably being a tooth-like or serrated-like cutting surface. The housing 31 also has a further truncated conical recess 38 which is aligned with and diverges outwardly from the other end of the passage 33, and this other truncated conical recess 38 also preferably mounts therein three cutting elements 36 which extend generally radially of the recess 38 and are disposed in angularly spaced relation therearound. The upper and lower recesses 34 and 38 as defined in opposite axial ends of the cutting head assembly preferably define different conventional cutting angles, one preferably being a 45° valve face cutting angle (the upper recess 34 in the illustrated embodiment) and the other preferably being a conventional 30° valve refacing angle (the lower recess 38 in the illustrated embodiment).

The general construction of the cutting head assembly and specifically the formation of the truncated conical recesses and the mounting of the cutting elements therein is conventional. Further, this general construction is also described in U.S. Pat. No. 4,637,672 as owned by the Assignee hereof.

The housing 31 of the cutting head assembly, in the illustrated embodiment, also preferably has an annular flange 39 which projects radially outwardly a limited extent beyond the outer cylindrical wall 41 of the housing, with this flange 39 being disposed generally axially at the center of the housing so as to define axially oppositely facing abutment surfaces which project radially outwardly from the adjacent outer cylindrical housing walls 41. The cutter head housing 31 also preferably mounts thereon an elongate handle 42 which, in the illustrated embodiment, has a threaded inner end which engages a threaded opening in the housing for permitting detachment therefrom. This handle 42 preferably attaches to the housing generally through the enlarged annular flange 39, and projects radially outwardly in generally perpendicular relationship to the longitudinal axis 32. The handle 42 at its radially outer end preferably terminates in an enlarged gripping knob 43.

The cutting head assembly 21 is rotatably and removably supported by the support structure 23 which, as illustrated by FIG. 1, includes an annular support ring or case 46 having a stepped bore formed coaxially therethrough, the latter including an upper bore 48 of larger diameter which opens downwardly from the upper end of the case. This upper bore 48 terminates in an annular upwardly-facing shoulder 49 which projects radially inwardly where it joins to a lower bore 51 which is of smaller diameter than the upper bore and which projects downwardly through the lower end of the case.

The annular support ring or case 46 mounts therein an annular bearing 52, preferably a conventional anti-friction bearing, which provides for removable rotatable support of the cutting head assembly 21. This annular bearing 52 in the illustrated embodiment includes an outer race 53 which fixedly seats within the upper bore 48 so as to abut the shoulder 49, with an inner bearing race 54 being supported and rotatably carried on the outer race 53 through a plurality of intermediate rolling bearing elements 56 such as balls or rollers. This inner race 54 defines an inner diameter or bore 57 which is only slightly greater than the outer cylindrical wall 41 of the cutting assembly housing 31 so that the cutting head housing 31 can be snugly positioned within the bore 57, whereby the annular flange 39 on the cutting head housing thus axially abuts the inner race of the anti-friction bearing. The cutting head housing 31 can be removed and reversely positioned within the anti-friction bearing 52.

The annular support ring 46 also has a manually-engageable handle 59 fixed thereto, as by means of a threaded engagement therebetween, which handle is cantilevered radially outwardly away from the support ring. The handle 59 projects outwardly through only a limited extent so that the free end of the handle 59 is disposed radially inwardly from the gripping knob 43 associated with the handle 42 so as to not interfere with free access to the knob 43 and rotation of the cutting head assembly. The handle 59, when the refacing device 11 is mounted in an upright use position as illustrated by FIG. 1, is disposed axially below the handle 42.

Figure 4:
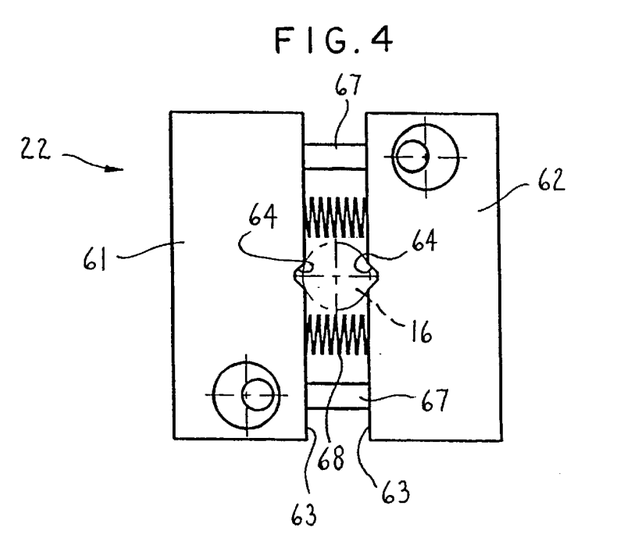
FIG. 4 is a view taken generally along line 4—4 in FIG. 1 and showing the gripping blocks in a position for gripping a large diameter valve stem.
Figure 5:
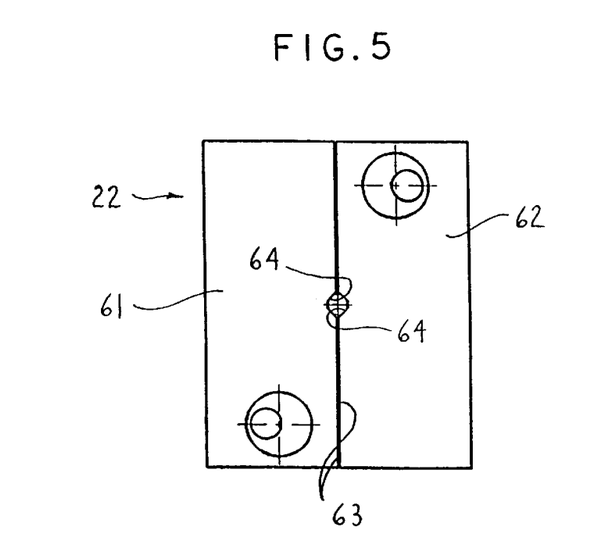
FIG. 5 is a view like FIG. 4 but showing the gripping blocks in gripping engagement with a valve stem of small diameter.

The gripping mechanism 22, as illustrated by FIGS. 1 and 4–5, includes a pair of block-like gripping jaws 61 and 62 which are disposed in transversely opposed relationship. These gripping jaws 61 and 62 have inner and generally parallel surfaces 63 which oppose one another, and which extend generally parallel with the longitudinal axis 32 of the device. The opposed surfaces 63 have transversely aligned notches 64 formed therein, which notches 64 extend transversely across the width of the faces 63 in generally parallel relation with the longitudinal axis 32. The notches 64 are of a generally V-shaped configuration so that, when the gripping jaws 61 and 62 are moved inwardly so as to clampingly engage the elongate valve stem 16 therebetween, the valve stem is effectively engaged within and between the opposed notches 64 so as to permit secure nonrotatable gripping of the valve stem between the gripping jaws. These gripping jaws 61, 62 and the notches 64 formed therein thus permit valve stems having a significant range in diameter to be gripped therebetween. FIG. 4 illustrates the gripping of a rather large diameter valve stem between the gripping jaws, and FIG. 5 illustrates the gripping of a very small diameter valve stem between the jaws.

The gripping jaws 61 and 62 have generally flat and substantially parallel outer surfaces 65, the latter generally being in planes which are parallel with the longitudinal axis 32, which outer surfaces 69 permit the gripping jaws 61, 62 to be clampingly engaged with and between the opposed front faces defined on conventional vise jaws 14 and 15. The gripping jaws 61 and 62 are preferably provided with top flanges 66 which project transversely outwardly beyond the surfaces 65 so that these flanges can be positioned to project over and abut against upper surfaces of the vise jaws 14–15 to facilitate the positioning and securing of the gripping jaws within the vise jaws.

The opposed gripping jaws 61 and 62, in the illustrated embodiment, are joined together by a plurality of generally parallel guide rods 67 which extends generally perpendicularly between the opposed surfaces 63, which guide rods provide a slidable engagement with at least one of the gripping jaws so as to permit the jaws 61, 62 to be slidably relatively moved toward and away from one another. A plurality of compression springs 68 also preferably coact transversely between the gripping jaws so as to normally urge the gripping jaws into an outward or open position.

The gripping jaws 61, 62 are preferably constructed of a relatively stiff or hard material having only limited elastomeric properties, such as a relatively stiff and hard rubber-like or plastic material, whereby the jaws can thus securely and safely grip the valve stem without damaging the surface thereof. This can also be achieved by providing the gripping jaws with inserts in the faces thereof, which inserts would be constructed of the hard and stiff rubber-like or plastic material and would define the grooves 64 therein for gripping engagement with the valve stem.

Figure 7:
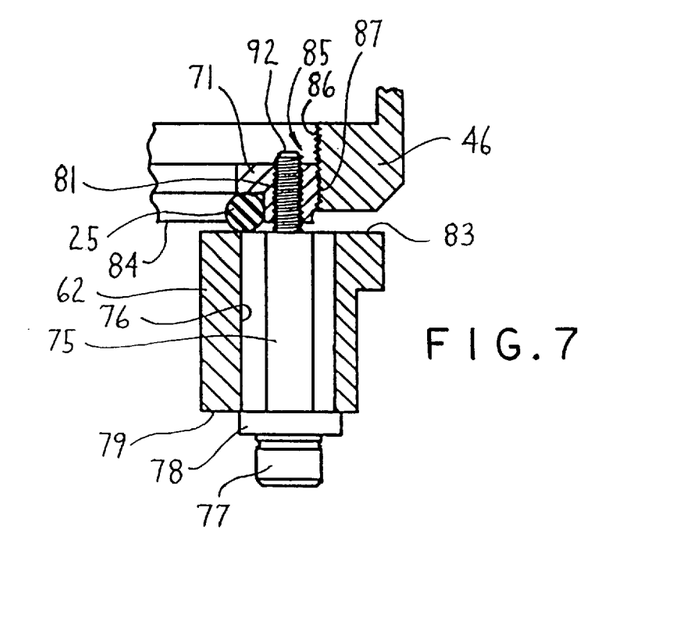
FIG. 7 is a fragmentary sectional view taken generally along line 7—7 in FIG. 6.

The connecting structure 24 which secures the support structure 23 to the gripping mechanism 22 includes, as illustrated by FIGS. 1 and 7, an annular connecting member or ring 71 which is longitudinally positioned between the gripping jaws 61, 62 and the support case 46. This connecting ring 71 is disposed concentrically with respect to the longitudinal axis 32 and has a stepped bore extending coaxially therethrough, the latter including a lower bore 72 which is of larger diameter and projects axially upwardly from the lower end of the connecting ring 71 so as to terminate at a downwardly-facing annular shoulder 73. This shoulder 73 projects radially inwardly through a limited extent and merges with an upper bore 74 which is of smaller diameter and which projects axially upwardly through the upper end of the connecting ring 71.

The connecting structure 24 also includes a plurality, two in the illustrated embodiment, of longitudinally elongate connecting rods 74 which join the connecting ring 71 to the gripping jaws 61–62. One of the connecting rods 75 extends through each of the gripping jaws 61–62, the rod 75 being accommodated in an enlarged opening or bore 76 which projects through the gripping jaw in generally parallel relation with the longitudinal axis 32. Each connecting rod 75 at its lower end is provided with an enlarged head 77 which is disposed below and engaged against an enlarged washer 78, the latter in turn being adapted for engagement with a bottom surface 79 of the respective gripping jaw 61, 62. Each connecting rod 75 at its upper end is provided with a reduced diameter threaded part 81 (FIG. 7) which is engaged within a threaded opening which extends axially through the connecting ring 71 outwardly of the large diameter bore 72. The two connecting rods 75 are thus fixedly secured to and projecting axially from the connecting ring 71, preferably at substantially diametrically opposite locations thereof.

The energy or pressure generating structure 25, as illustrated in FIGS. 1 and 7, is disposed longitudinally between the connecting ring 71 and the gripping jaws 61–62 so as to normally maintain a longitudinally spaced relationship therebetween whereby the upper surfaces 83 of the gripping jaws 61, 62 are normally spaced at least a limited downward distance from the bottom surface 84 of the connecting ring. The pressure generally device 25 comprises one or more springs which cooperate between the gripping jaws and the connecting ring, the spring in the illustrated embodiment being an elastomeric O-ring which concentrically surrounds the axis 32 and is confined generally within the large-diameter bore 72, whereby the O-ring 25 is thus subject to longitudinal compression between the shoulder 73 of the connecting ring, and the upper surfaces 83 of the gripping jaws. The O-ring 25, when the device is in its assembled condition but is not being used, and is released from the vise 12, will normally be maintained in at least a minimal axially compressed condition between the opposed surfaces 73 and 83, in which condition the connector rod heads 77 acting through the washers 78 abut the lower surfaces 79 of the gripping jaws 61, 62 to maintain the device properly assembled.

The valve refacing device 11 also includes a pressure adjusting structure 85 which, in the illustrated embodiment, cooperates between the support ring or case 46 and the connecting ring 71 to permit the pressure generated within the O-ring 25 to be adjusted when the refacing device 11 is being used for resurfacing a poppet valve. This pressure adjustment structure 85, in the illustrated and preferred embodiment, is formed generally as a cam structure which permits such adjustment, and the cam structure is defined by internal threads 86 formed on the inner bore of the support ring 46, which threads 86 are in turn engaged with mating external threads 87 formed on the outer cylindrical wall of the connecting ring 71. These cooperating threads 86–87 effect axial displacement of the connecting ring 71 relative to the support ring 46 in response to rotation of the support ring 46 due to manual engagement with the handle 59 thereof.

Figure 6:
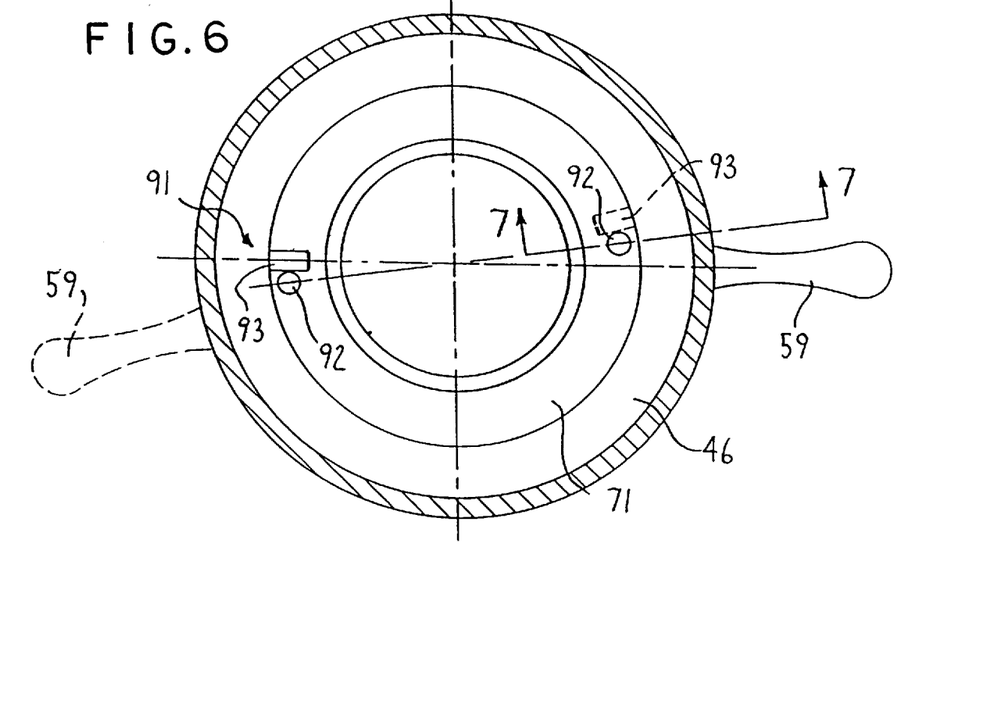
FIG. 6 is a sectional view taken along line 6—6 in FIG. 1.

To control the magnitude of adjustment of the pressure generating device due to relative rotation between the rings 46 and 71, the latter define thereon a cooperating stop structure 91 (FIG. 6). This stop structure includes a pair of stops 92 which are fixed to the ring 71 and project outwardly at substantially diametrically opposite sides thereof. These stops 92 in the illustrated embodiment may be defined by the upwardly projecting free ends of the connecting rods 75. These stops 92 are positioned so as to be in the path of a further stop 93 which is defined by a pin which is fixedly secured to the support ring 46 and which projects radially inwardly therefrom for abutting contact with the stops 92. The support ring 46 as illustrated in FIG. 6 has a rotational travel of about 180° relative to the connecting ring 71, such being limited by the engagement of the two stops 92 with the stop pin 93.

The operation of the device 11 for effecting resurfacing of a valve face on a poppet valve will now be briefly described to ensure a more complete understanding thereof.

The refacing device 11 is initially positioned in the vise or clamp 12 so that the gripping jaws 61–62 are held between the vise jaws 14, 15, although the gripping jaws will be maintained spaced apart sufficiently to permit insertion of the valve stem therebetween. The poppet valve 13 to be refinished in then inserted downwardly through the device so that the stem 16 projects downwardly between the opposed gripping jaws 61, 62, and the valve surface 18 generally engages with the cutting elements 36 associated with the upper conical recess.

The operator then applies finger pressure to the upper end of valve 13 so that it is urged downwardly relative to the device 11, thereby maintaining the valve surface 18 in snug engagement with the cutting surfaces associated with the cutting elements 36. With this downward finger pressure maintained on the valve 13, the operator then tightens the vise or clamp 12 so that the gripping jaws 61 and 62 move inwardly and effect secure gripping engagement with the valve stem 16 substantially as illustrated by FIGS. 4 and 5. When in this latter condition, the valve 13 is now securely held and is at least lightly axially tensioned due to the stem being engaged between the gripping jaws, and the valve surface being engaged against the cutting elements.

To provide the desired and necessary contact pressure between the valve surface 18 and the cutting elements 36, the operator grips the knob 59 and effect rotation thereof in the proper direction through a limited angular extent. This rotation of knob 59 causes limited rotation of the connector ring 46 which, due to the threaded connection 86–87 with the connector ring 71, tends to effect relative axial displacement therebetween. The rotation of connector ring 46 is selected in the appropriate direction to effect axial separation between the rings 46 and 71. Since the gripping jaws 61 and 62 are held in the clamping device and engage the stem of the poppet valve, which valve in turn has the head thereof engaged with the cutting elements so that the cutting head assembly 21 is restrained from moving axially upwardly, the rotation of connecting ring 46 (which itself is effectively axially restrained) thus causes downward axial displacement of the connector ring 71 toward the stationary gripping jaws 61–62. This hence causes additional compression of the spring or O-ring 25, thereby increasing the force or pressure which extends axially of the device 11 and effectively imposes an axially directed separation force between the gripping mechanism 22 and the cutting head assembly 21. This axially directed separation force or pressure, as generated by the additional compression of the O-ring 25, is transmitted upwardly through the support ring 46 to the housing 31 of the cutting head assembly, and thence to the cutting blades 36 so as to provide the desired contact pressure between the cutting blades 36 and the valve surface 18. This pressure, in conjunction with the configuration of the cutting head assembly 21 and the presence of three angularly spaced cutting blades 36, is also effective for substantially causing self-centering of the valve head within the upper conical recess so that substantially uniform contact pressure exists between the valve face and each of the cutting blades.

When the operator has rotated the support ring 46 through the desired angular extent to achieve what is believed to be the desired contact pressure between the valve surface and the cutting blades, the operator releases the knob 59, and the threaded connection between the rings 46 and 71 will effect holding of the support ring 46 in a stationary condition with respect to the connecting ring 71.

The operator then grips the knob 43 of the handle 42 so as to effect rotation of the cutting head assembly 21 relative to both the valve 13 and the support ring 46, such rotation being readily permitted due to the valve head assembly 21 being supported on the anti-friction bearing 52. The operator will rotate the valve head assembly 21 through a plurality but limited number of rotations at a fairly uniform speed. During the initial two or three rotations of the valve head assembly 21, the cutting blades 36 are most effective with respect to effecting resurfacing of the valve face 18, particularly with respect to removing the high points or areas of greatest surface irregularity. When the greatest amount of material is removed from the valve face 18 during these initial two or three rotations, the pressure force generated by the spring 25 will act upwardly through the ring 46 onto the housing of the cutting head assembly so as to always urge the latter upwardly to maintain pressure contact between the cutting blades and the valve surface. As a result of the material removed during these initial revolutions, however, there may be a slight upward movement of the valve head assembly and hence a reduction in the contact pressure between the cutting blades 36 and the valve surface 18. The operator will continue to rotate the valve head assembly 21 through some additional rotations, typically a total of between 10 and 15 rotations is anticipated as being desirable. These remaining rotations will effect a higher degree of resurfacing of the annular valve face.

The operator can then terminate the resurfacing operation and remove the valve from the device to permit inspection thereof. For this purpose, the operator will preferably first initially reversely rotate the support ring 46 to release the compression of the O-ring 25. Thereafter the operator will release or loosen the vise 12 sufficiently to release the clamping engagement between the gripping jaws and the valve stem, whereupon the operator can then manually engage and lift the poppet valve 13 upwardly for removal from the device 11. If further refinishing of the valve face is deemed necessary, the valve will be remounted in the device and the same refinishing operation will again be performed generally as described above.

In addition, if during the refinishing of the valve seat it is believed necessary to effect additional rotations or effect additional material removal from the annular valve face, it will be appreciated that after the initial two or three rotations of the valve head, the operator can again grip the knob 59 and effect additional slight angular rotation of the support ring 46 to again increase the compression of the O-ring 25, and thus again increase the contact pressure between the cutting blades and the valve face, whereby additional manual rotations of the cutting head assembly will be effected for permitting a higher quantity of material removal from the valve face.

In the device 11 of the present invention, the contact pressure between the valve face and the cutting elements is achieved and adjusted by the degree of compression of the spring or O-ring 25, and the resiliency achieved through this arrangement helps to eliminate possible pressure overloads and creates a situation whereby pressure changes occur gradually in both an increasing and a decreasing direction, but at the same time continues to provide relatively uniform and steady pressure between the cutting elements and the valve face even if the relative rotation therebetween is less than uniform. This resilient pressure generating spring or O-ring also is effective for cushioning shocks generated due to either structural or operational irregularities.

Further, the device 11 can readily be modified to accommodate different valve angles by either interchanging the cutter head assembly or, in the illustrated and preferred embodiment, by merely removing and reversely mounting the cutter head assembly 21 with respect to the bearing 52 so that either the 30° or 45° angle faces upwardly and thus two of the more common configurations of poppet valves can be refaced with the device 11 merely by inverting the longitudinal orientation of the cutter head assembly.

The foregoing description is limited to one preferred embodiment of the invention. It should be clear, however, that the structure of the invention may differ from what has been described and illustrated. For example, various camming mechanisms could be utilized with the connecting and holder mechanisms to adjust the pressure between the cutting elements and the valve face.

Further, the gripping mechanism could be different, such as the jaws being replaced with a tiltable locking plate for grasping the valve stem.

Further, the device is not limited to surfacing valve faces, but is also useable on other similar shaped articles.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve refacing device for refacing a truncated conical valve face on a head of a poppet valve having an elongate stem projecting coaxially from the valve face, comprising:

a cutting head assembly for refacing a valve face on a poppet valve, and cutting head assembly including a housing having a passage extending axially therethrough, said passage at one end including a truncated conical recess which diverges outwardly toward said one end for accepting the head end of the valve therein with the stem projecting coaxially through said passage, said recess being defined by a surrounding truncated conical surface, and at least one cutting element mounted in said conical surface;

gripping means including a pair of relatively movable gripping jaws for permitting stationary gripping of the valve stem between said jaws;

support means disposed between said cutting head assembly and said gripping means for rotatably supporting said cutting head assembly for rotation relative to said gripping means about the longitudinally extending axis of said passage;

a pressure generating arrangement cooperating with said cutting head assembly for imposing an axially directed force thereon in a direction axially away from said gripping means; and adjustable connecting means coacting between said support means and said gripping means for varying said force to adjust the contact pressure between the valve face and said cutting element when the stem is clamped between said gripping jaws.

2. The device according to claim 1, wherein said pressure generating arrangement is disposed between said gripping means and said connecting means for maintaining contact pressure between the cutting element and the valve face as the valve face is resurfaced.

3. The device according to claim 2, wherein said pressure generating arrangement is an elastomeric O-ring.

4. The device according to claim 1, wherein said gripping jaws include opposed V-shaped notches for gripping the valve stem therebetween.

5. The device according to claim 1, wherein said gripping jaws have a pair of guide pins disposed therebetween for permitting the jaws to relatively move between open and closed positions, and at least one spring coacting between said gripping jaws for urging said griping jaws toward said open position.

6. The device according to claim 1, wherein said support means includes a support member provided with an annular bearing on which said cutting head assembly is supported for rotation with respect to said support member about a longitudinally extending axis of said device.

7. The device according to claim 6, including an elongate handle fixed to and projecting radially outwardly from the housing of said cutting head assembly and adapted for gripping engagement by an operator to permit manual rotation of said cutting head assembly about said axis relative to said support member.

8. The device according to claim 6, wherein said passage which extends through the housing of said cutting head assembly has a second truncated conical recess which diverges outwardly from the other end thereof and which is defined by a second surrounding truncated conical surface which mounts at least one said cutting element thereon, the truncated conical recesses defined at opposite ends of said passage being of different angles, and said cutting head assembly being removably supported on the bearing of said support member so that the cutting head assembly can be removed and reversely oriented so that either truncated conical recess can be positioned for engagement with the head of a poppet valve when the latter is positioned in the device.

9. The device according to claim 6, wherein the connecting means includes a connecting member which is positioned adjacent said support member and an adjustment structure connected between said connecting member and said support member for effecting relative movement therebetween longitudinally of said device in response to rotation of said support member relative to said connecting member.

10. The device according to claim 9, wherein said connecting member longitudinally cooperates with said pressure generating arrangement for adjusting the longitudinally directed force thereof in response to longitudinal adjustment in the position of said connecting member relative to said support member.

11. The device according to claim 10, wherein said pressure generating arrangement comprises an elastic O-ring which is disposed concentrically with respect to the longitudinal axis and is effectively compressed between longitudinally opposed surfaces defined on said connecting member and said gripping jaws.

12. The device according to claim 11, wherein said adjusting device comprises engaged threads formed on said support member and said connecting member.

13. The device according to claim 12, wherein said connecting means includes connecting rods which are fixed to said connecting member and project therefrom longitudinally of said device for connection to said gripping jaws, said connecting rods being longitudinally movable relative to said gripping jaws for permitting said connecting member to be moved longitudinally toward said gripping jaws and effect compression of said O-ring in response to relative rotation adjustment between said connecting member and said support member.

14. A device for resurfacing a truncated conical valve face on a head of a poppet-type valve of a combustion engine, the valve having an elongate stem projecting coaxially from the valve face, comprising:

a bearing case having a stepped bore extending axially therethrough, said stepped bore including a large-diameter bore portion which opens outwardly through one axial end of said case, said large-diameter bore portion defining an annular bottom wall on said case, said stepped bore also including a small-diameter bore portion which opens through the other end of said case and coaxially communicates with said bearing case large-diameter bore portion, said small-diameter bore portion defining a small-diameter bore inner wall, said inner wall having threads disposed thereon;

a base having a stepped bore extending axially therethrough, said stepped bore including a large-diameter bore portion which opens outwardly through one axial end of said base, said large-diameter bore portion defining an inner annular top wall on said base, said stepped bore also including a small-diameter bore portion which opens through the other end of said base and coaxially communicates with said base large-diameter bore portion, said base having an outer wall with threads disposed thereon, said base threads engaged with said bearing case threads to urge said base toward and away from said bearing case as said bearing case is rotated;

gripping means removably secured to said base and having a pair of relatively transversely movable gripping jaws for gripping the stem therein; and cutting means removably rotatably attached to said bearing case for surfacing the valve face, said cutting means having an aperture for insertion of the valve stem therethrough, said cutting means aperture, said bearing case stepped bore, said base stepped bore and said gripping means all coaxially communicating to allow a valve stem to pass therethrough and be secured by said gripping means such that as said bearing case is rotated, the contact pressure between the valve head and said cutting means is controllable.

15. The device according to claim 14, including a spring means disposed between said gripping means and said base for maintaining the contact pressure as the valve is refaced.

16. The device according to claim 14, wherein said spring means is an elastomeric O-ring.

17. The device according to claim 14, wherein said gripping jaws have opposed V-notches for engaging the valve stem.

18. The device according to claim 14, further comprising:

a stop pin fixed to said bearing case, at least one screw securing said gripping means to said base, said screw having an end extending through and beyond said base such that as said bearing case is rotated said stop pin contacts said screw end for limiting the rotation of said bearing case.

19. A device according to claim 14, wherein said cutting means comprises:

a cylindrical cutting head having a truncated upper conical recess outwardly opening through an end of said cutting head, and a truncated lower conical recess outwardly opening through another end of said cutting head, said upper conical recess and said lower conical recess coaxially communicating, said upper conical recess defining an upper conical surface on said cutting head, said lower conical recess defining a lower conical recess on said cutting head, said cutting head removably rotatably attached to said bearing case;

a plurality of elongated cutting blades removably mounted on said upper conical surface and on said lower conical surface, said cutting blades extending substantially radially outwardly along said conical surfaces and each having a cutting surface thereon which is spaced outwardly from the respective conical surfaces;

a handle having an end attached to said cutting head and another end extending away from said cutting head; and said truncated upper conical recess, said truncated lower conical recess, said bearing case stepped bore, said base stepped bore and said gripping means all coaxially communicating to allow a valve stem to pass therethrough and be fixably held by said gripping means such that as said bearing case is rotated, contact pressure between said cutting surfaces and a valve face is adjustable, and rotation of said handle causes said cutting blades to resurface the valve face.

20. The device according to claim 14, wherein said truncated upper conical recess outwardly opens at a first angle and said truncated lower conical recess outwardly opens at a second angle.

\* \* \* \* \*